United States Patent [19]

Iu

[11] Patent Number: 5,293,229
[45] Date of Patent: Mar. 8, 1994

[54] APPARATUS AND METHOD FOR PROCESSING GROUPS OF FIELDS IN A VIDEO DATA COMPRESSION SYSTEM

[75] Inventor: Siu L. Iu, Bensalem, Pa.

[73] Assignee: Matsushita Electric Corporation of America, Secaucus, N.J.

[21] Appl. No.: 859,145

[22] Filed: Mar. 27, 1992

[51] Int. Cl.[5] ............................................. H04N 7/137
[52] U.S. Cl. ..................................... 348/415; 548/384
[58] Field of Search .............................. 358/136, 133; H04N 7/137

[56] References Cited

U.S. PATENT DOCUMENTS

| | | | |
|---|---|---|---|
| 4,985,768 | 1/1991 | Sugiyama . | |
| 4,999,705 | 3/1991 | Puri . | |
| 5,063,443 | 11/1991 | Okajima | 358/133 |
| 5,089,889 | 2/1992 | Sugiyama . | |
| 5,093,720 | 3/1992 | Krause | 358/136 |
| 5,103,307 | 4/1992 | Sugiyama . | |
| 5,146,325 | 9/1992 | Ng | 358/136 |

OTHER PUBLICATIONS

Grossman, D. D. IBM Technical Disclosure Bulletin vol. 15, No. 5, Oct. 1972, "Double Compression", pp. 1698–1699.

"MPEG Video Stimulation Model Three (SM3)", ISO Simulation Model Editorial Group, Jul. 25, 1990.

"Advanced Digital Television Description", The Advanced Television Consortium, Feb. 27, 1991.

"Two Dimensional Signal and Image Processing" by Jae S. Lim, Prentice-Hall, pp. 568–575 1990 (month not avail.).

"Noise Reduction in Image Sequences Using Motion-Compensated Temporal Filtering" by Eric Dubois et al. IEEE Trans. on Communications, vol. COM-32, No. 7, Jul., 1984.

"Coded Representation of Picture and Audio Information", T. Odaka et al. ISO-IEC/JTC1/SC29/WG11, Nov., 1991, pp. 1–10.

"Video Coding With Motion-Compensated Interpolation for CD-ROM Applications", A. Puri et al., Signal Processing: Image Communication 2, vol. 2, No. 2, Aug., 1990, pp. 127–144.

"Moving Picture Coding System for Digital Storage Media Using Hybrid Coding", A. Nagata et al., Signal Processing: Image Communication 2, vol. 2, No. 2, Aug., 1990, pp. 109–116.

Primary Examiner—Tommy P. Chin
Assistant Examiner—Bryan S. Tung
Attorney, Agent, or Firm—Ratner & Prestia

[57] ABSTRACT

A video compression system which is based on the image data compression system developed by the Motion Picture Experts Group (MPEG) uses various group-of-fields configurations to reduce the number of binary bits used to represent an image composed of odd and even fields of video information, where each pair of odd and even fields defines a frame. According to a first method, each field in the group of fields is predicted using the closest field which has previously been predicted as an anchor field. According to a second method, intra fields (I-fields) and predictive fields (P-fields) are distributed in the sequence so that no two I-fields and/or no two P-fields are at adjacent locations in the sequence. According to a third method, the number of I-fields and P-fields in the encoded sequence is reduced by encoding one field in a given frame as a P-field or a B-field where the other field is encoded as an I-field and encoding one field in a further frame as a B-field where the other field is encoded as a P-field.

12 Claims, 5 Drawing Sheets

APPARATUS AND METHOD FOR PROCESSING GROUPS OF FIELDS IN A VIDEO DATA COMPRESSION SYSTEM

BACKGROUND OF THE INVENTION

The present invention concerns video data compression and in particular, apparatus and a method for processing groups of successive fields of video information to obtain high levels of data compression.

Image sequence data compression systems such as that proposed by the Moving Pictures Experts Group (MPEG), a committee within the International Standards Organization (ISO), have been very effective in coding image sequences for video signals under the NTSC standard as well as for High Definition Television (HDTV) sources. The MPEG system is described in a paper entitled "MPEG Video Simulation Model Three (SM3)" by the Simulation Model Editorial Group, available from ISO as ISO-IEC/JTC1/SC2/WG11/N0010 MPEG 90/041, 1990 which is hereby incorporated by reference for its teachings on the MPEG video signal encoding method.

The MPEG system integrates a number of well-known data compression techniques into a single system. These include motion-compensated predictive coding, discrete cosine transformation (DCT), adaptive quantization and variable length coding (VLC).

The motion-compensated predictive coding schemes used in HDTV systems process the video data in groups of frames in order to achieve relatively high levels of compression without allowing the performance of the system to be degraded by excessive error propagation. In these group of frame processing schemes, image frames are classified into one of three types: the intra-frame (I-frame) the predicted frame (P-frame) and the bidirectional frame (B-frame).

A two dimensional DCT is applied to small regions such as blocks of 8 by 8 pixels to encode each of the I-frames. The resulting data stream is quantized and encoded using a variable-length code, such as an amplitude run-length Huffman code, to produce the compressed output signal. P-frames and B-frames are processed as residues of corresponding I and P-frames, respectively, encoded using the two-dimensional DCT, quantized and variable-length coded. A typical sequence of frames may be represented by a sequence such as I, B, B, P, B, B, I, B, etc.

To operate effectively in the presence of inter-frame motion, several overlapping corresponding blocks from the I-frame or P-frame are compared with each block of a P or B-frame to find the one with the smallest residue. The residue block is then encoded using the two-dimensional DCT, adaptive quantization and variable-length coding. The reference block that was used to obtain the residue is then designated as the predecessor of the block to be encoded and is defined by a motion vector which is transmitted with the encoded residue block. This vector describes the displacement in the image plane which is needed to place the reference block in its target position in the new frame.

Processing frames in groups achieves a high level of data compression due to the strong temporal correlation among successive frames in conventional video images. Redundant information in the images is greatly reduced by the predictive coding method used for the P and B-frames. Under this method, small blocks of data from reconstructed I and P-frames are subtracted from corresponding blocks of data from the respective frames to be encoded as P and B-frames. The result of this operation is residue data values which describe the P-frames in terms of the I-frames and the B-frames in terms of the I and/or P-frames. For P and B-frames, only this residue data is encoded and transmitted.

This coding is undone at a receiver which reverses the steps to obtain reconstructed image data. Any errors in a frame that is used to predict other frames may propagate to the predicted frames. In addition, the dependence of one frame on its predecessor I or P-frame limits the ability of the receiver to display a frame selected at random and to accommodate standard television functions such as intra-group scene changes and channel switching. These limitations could be removed by encoding each frame as an I-frame, however, the resulting coded video signal would need considerably more bits per frame since it would not exploit the temporal redundancy that is inherent in most video information.

The MPEG encoding standard is designed for frame-oriented image sequences. Most video sources, however, provide a frame of information as two interlaced fields which are separated in time by one field interval. The standard has been adapted in two ways to accommodate field-oriented image sequences. The first method combines the successive even and odd fields of the interlaced source to form a sequence of frame images and then applies MPEG encoding to the sequence of frames. It is well known that, due to the temporal separation between successive fields, this method may produce unsatisfactory results. The second method avoids these problems by applying MPEG encoding to the sequence of fields in the same manner that it would be applied to a sequence of frames.

Motion predictive encoding is a problem with any of the MPEG encoding methods. As described above, the process of matching blocks in a predicted frame to displaced blocks in an anchor frame plays a key role in reducing the prediction residue and, thus, the bit rate for an MPEG encoded signal. The block matching method which is most commonly used assumes that blocks of pixels move by simple translation (i.e. vertically and/or horizontally) in the image plane from frame to frame or from field to field. This method does not perform well, for example, when the block is part of an object which is rotated about an axis in the image plane or which is subject to a change in size due to motion into or out of the frame or such as would result from an image zoom. In addition, this encoding method may not work well when there is a relatively large temporal separation between a frame to be predicted and its reference or anchor frame.

SUMMARY OF THE INVENTION

The present invention is embodied in a video encoding system which uses field-oriented motion predictive coding based on data in one or more anchor fields to compress video data. The system includes an apparatus which processes groups of fields of video data such that a predicted field is encoded using at least one anchor field which has previously been encoded and which is closer in time to the predicted field than any other previously encoded field.

According to another aspect of the invention, the motion predictive coding method employs I, P and B-field types. The input video fields are encoded such that a sequence of B-fields separates each I or P-field from the next successive I or P-field.

According to another aspect of the invention, the method modifies the sequence of I, P and B-fields defined by the MPEG group of frames to substitute P or B-fields for I-fields and B-fields for P-fields in selected positions in the sequence.

DETAILED DESCRIPTION

Figure 1:
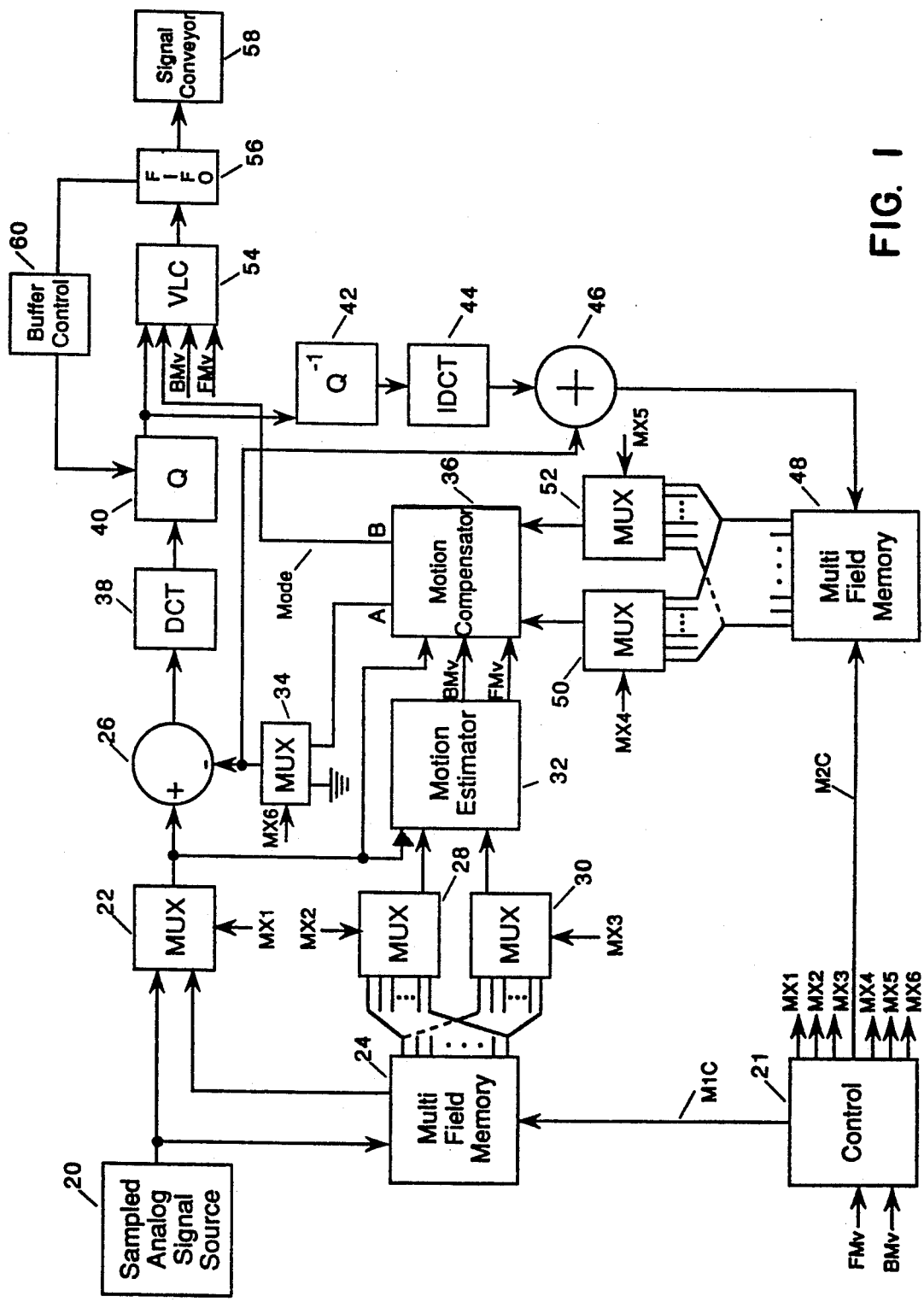
FIG. 1 is a block diagram of an exemplary video encoding system which includes an embodiment of the invention.

FIG. 1 is a block diagram of an encoder adapted to perform a modified version of the MPEG video signal encoding method using successive video fields instead of frames. Source 20, which may be, for example, a high-definition video camera, supplies a digital video signal to an input multiplexer 22 as well as to the input port of multi-field memory 24. Multi-field memory 24 includes a sufficient number of storage locations to hold N image fields provided by the source 20. In the exemplary embodiments of the invention, N may be an integer between 6 and 9, depending upon the embodiment. Smaller memories may be used if the processes are optimized to store only the actual data that are needed for present or future encoding operations. This memory holds successive video fields provided by the source 20 while the fields are being encoded using the disclosed encoding methods. The number of fields used in each of the exemplary methods is set forth below with reference to FIGS. 2-9 which illustrate the various methods.

The multi-field memory 24 supplies a signal to an input port of multiplexer 22. This signal is used for processing B-fields. The multiplexer 22 is controlled by a signal MX1 to select either the signal from source 20 or one of the signals provided by the multi-field memory 24, to the plus input port of a subtracter 26. The minus input port of the subtracter 26 is coupled to a multiplexer 34 which may be controlled by a signal MX6 to provide either a zero value or the output signal A from a motion compensator circuit 36, as described below. The exemplary subtracter 26 is actually 256 eight-bit subtracters which are configured to simultaneously subtract four 8 by 8 pixel blocks provided by the motion compensator circuit 36 from four corresponding 8 by 8 pixel blocks provided by the multiplexer 22. The arrangement of four 8 by 8 blocks as one 16 by 16 pixel block is defined in the MPEG standard as a macroblock. In the exemplary embodiment of the invention, all motion compensation is performed on the basis of a macroblock.

The motion compensator 36 receives five input signals, a Backward Motion vector (BMv) and a Forward Motion vector (FMv) from a motion estimator 32, the output signal of the multiplexer 22, and macroblocks of pixel data from one or two reconstructed fields which are held in a second multi-field memory 48. These macroblocks are provided via the multiplexers 50 and 52.

When the field being encoded is a B-field, the motion compensator 36 selects pixel values indicated by one or both of the signals FMv and BMv from one of the two macroblocks provided by the multi-field memory 48 or the average values of the two macroblocks. If the field being encoded is a P-field, the compensator selects the pixel values indicated by the signal FMv from the forward macroblock provided by the multi-field memory 48.

These pixel values are applied to the minus input port of the subtracter 26 while the corresponding pixel values from the field to be encoded are applied to the plus input port. The signal provided by the subtracter 26 is the predictive code residue of the input macroblock provided by the multiplexer 22. That is to say, the input macroblock minus the macroblock provided by the multiplexer 34.

The motion vectors, BMv and FMv, are provided by motion estimator circuitry 32 which receives respective input signals, each representing at least a macroblock of pixels, from multiplexer 22, multiplexer 28 and multiplexer 30. These multiplexers, in turn, are coupled to receive signals representing stored video data from the multi-field memory 24. The motion estimator 32 used in this embodiment of the invention, simultaneously compares a macroblock of data provided by the multiplexer 22 with corresponding overlapping macroblocks of data from one or two fields held by the multi-field memory 24. The exemplary motion estimator 32 is a high-performance processor which simultaneously compares a target macroblock of 16 by 16 pixels, provided by the multiplexer 22, with 256 overlapping 16 by 16 macroblocks of pixels provided from a single field. A motion estimator suitable for use as the estimator 32 may be constructed from multiple conventional motion estimation chips, for example, the ST-13-220 integrated circuit available from SGS Thomson semiconductors. Each macroblock of pixels processed by the motion estimator 32 represents a possible displacement of the target macroblock of pixels in the previous field. The 256 overlapping macroblocks of pixels define a 48 by 48 pixel block in the anchor field which is centered about the position of the target block and which defines the area that is processed to find a reference macroblock. The macroblock in the search area having, for example, the smallest difference with respect to the target macroblock is selected as the reference to be used to predict the target macroblock.

The output signal of subtracter 26 is either a macroblock of pixels from an I-field or a macroblock of residue pixels which represents either the difference between a P-field and its anchor I-field or the difference between a B-field and one or both of its anchor I and P-fields.

The next step in the process is to diagonally (i.e. zigzag) scan each of the four blocks within the macroblock and to transform the diagonally scanned data into DCT coefficients using a Discrete Cosine Transform processor 38. In the exemplary embodiment of the invention, the DCT processor 38 is able to simultaneously process the four blocks of data that make up the macroblock provided by the subtracter 26 to produce four sets of DCT data. Once transformed, the DCT coefficients are quantized in parallel by quantizer 40.

The quantizer 40 assigns differing numbers of bits (i.e. uses a different quantization resolution) to represent the magnitude of each of the DCT coefficients, based in part on how people see video information at the frequency represented by the DCT coefficient. Since people are more sensitive to the quantization of image data at low spatial frequencies than to the quantization of data at high spatial frequencies, the coefficients representing the high spatial frequencies may be quantized more coarsely than the coefficients that represent low spatial frequencies.

The output signal of quantizer 40 is applied to Variable Length Coder (VLC) 54 as well as to an inverse quantizer 42. The VLC 54 encodes the quantized DCT coefficients by their amplitudes, at least one of the forward and backward motion vectors (FMv and BMv) and a mode signal provided by the motion compensator 36 for each block. The VLC 54 applies both run-length encoding and variable length code, such as a Huffman code to the block data. The data provided by the VLC 54 is then stored in a first-in-first-out (FIFO) memory device 56 that buffers the data, which may be supplied at varying rates, for transmission to a receiver through a signal conveyor 58.

To ensure that the average rate at which data is encoded matches the transmission rate, the FIFO 56 is coupled to a buffer control circuit 60. The circuit 60 monitors the amount of data in the FIFO 56 to change the size of the quantization steps applied by the quantizer 40. If the amount of data in the FIFO 56 is relatively low, then the quantization steps may be relatively fine, reducing any quantization related errors in the decoded video signal. If, however, the FIFO 56 is almost at its capacity, the buffer control 60 conditions the quantizer 40 to coarsely quantize the DCT coefficients, thus reducing the volume of data used to represent an image.

As described above, the quantized DCT coefficients from the quantizer 40 are also applied to an inverse quantizer circuit 42. This circuit reverses the process performed by the quantizer to recover the DCT coefficients with the precision of the assigned quantization resolution. Once the signal has been dequantized, it is subject to an Inverse Discrete Cosine Transform operation (IDCT) as represented by element 44. This element reverses the process performed by the DCT element 38 to recover macroblocks of image data from the quantized data stream.

If an I-field is being encoded, the data provided by the IDCT circuit 44 represents macroblocks of the signal as it would be reconstructed at the receiver. This signal is summed with zero-valued pixels, as provided by the multiplexer 34, in an adder 46 and stored in the second multi-field memory 48.

If, however, a P or B-field is being encoded, the output signal provided by the IDCT circuit 44 is added, by adder 46, to the selected macroblock of pixels from the anchor field (provided by the multiplexer 34) to produce a reconstructed macroblock of pixels. This macroblock is then stored in the multi-field memory 48 as a portion of a reconstructed version of the P or B-field which is being encoded. As described below, the reconstructed fields of pixels stored in the multi-field memory 48 may be used by the motion compensator 36 and subtracter 26 to generate the residue data for predictively encoding other P and B-fields.

Turning to the methods of field processing, FIGS. 2 through 9 show exemplary group-of-field configurations for a field-oriented MPEG system. Prior to describing these configurations, a discussion of the notation used in these figures is in order. The vertical lines in these figures represent successive fields of a video signal. The solid lines represent even fields and the broken lines represent odd fields. The letter above each line describes the type of field (i.e. either I, P or B) with the subscript indicating the number of the field in the represented sequence. I and P-field designators are surrounded by squares and circles, respectively.

Fields marked with a square are intra-coded. These fields are encoded using only data in the field. A field to which an arrow points, a target field, is predictively coded. The order in which the fields are encoded is indicated by the vertical position of the arrow or the square. A dot is placed on the arrow where it crosses a field to indicate that the dotted field may be used to predictively code the target field. An arrow having dots on two fields indicates that the target field may be predictively coded using either of the dotted fields as an anchor field. Only one field is selected for prediction, however, based on some measure of difference between the anchor field and the target field. Exemplary difference measures include the absolute magnitude of the differences between the anchor and target fields, and the mean squared magnitude of the differences between the anchor field and the target field.

A field to which two arrows point is a bidirectionally coded field. In a standard MPEG system, a B-field is coded using a preceding field, a following field or an average of the preceding and following fields as the anchor field. B-fields which have two dotted fields on each arrow indicate that two preceding and two following fields are compared to determine which preceding field and which following field have the smallest measure of difference with the target field. This determination is made on a macroblock basis by the motion estimator 32 which produces the motion vector output signals FMv and BMv. The determined preceding and following fields are then processed according to the MPEG method to predictively encode the target field.

Figure 2:
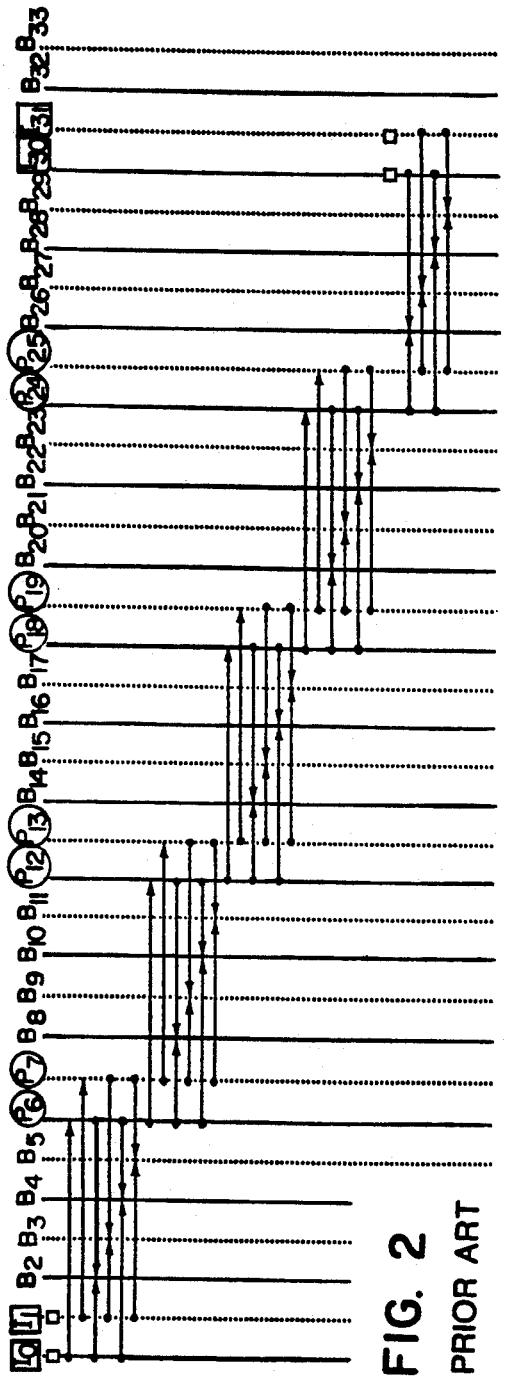
FIGS. 2 and 3, labeled prior art, are field sequence diagrams which are useful for describing the environment in which the invention operates.
Figure 3:
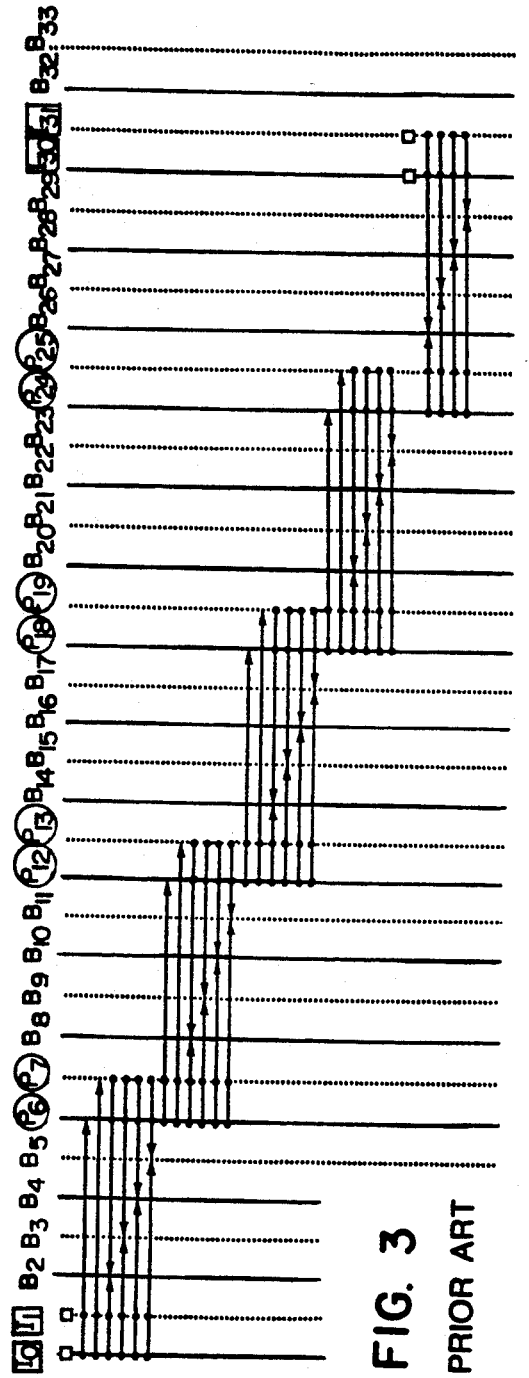

FIGS. 2 and 3 show two commonly used group-of-fields configurations for field-oriented MPEG systems. In these configurations, there are two I-fields, eight P-fields and twenty B-fields in a one-half second interval. Using these configurations, the predictive coding is refreshed at one-half second intervals.

FIG. 2 shows the generation, without prediction, of fields $I_0$ and $I_1$, the even and odd fields of the I-frame, respectively. As these fields are encoded, the pixel values from the source 20 are stored into respective field stores in the multi-field memory 24 while pixel values representing reconstructed versions of the image data are stored in the multi-field memory 48.

Next, image data from source 20 which will be encoded as the fields $B_2$ through $B_5$ is stored in respectively different field stores of the multi-field memory 24. Then, as represented by the dots and arrows, the field $I_0$ and $I_1$ are used to successively predict the even and odd P-fields, $P_6$ and $P_7$ as they are provided by the source 20 and stored into the multifield memory 24. To calculate the motion vectors for field $P_6$, for example, the control circuitry 21 conditions the multiplexers 28 and 30 to provide blocks of pixels from field $I_0$.

The exemplary embodiment of the invention uses a search area of 32 by 32 pixels from the anchor field to locate possible reference macroblocks for a field that is displaced by one frame interval (i.e. two field intervals) from the anchor. Since the search area is referenced to the center pixel of the macroblock, pixels from the reference field which may be used to calculate the residue and, thus the motion vectors, are defined by a 48 by 48 pixel block (i.e. $8+32+8$ by $8+32+8$).

In the exemplary sequence shown in FIG. 2, each P-field is separated from its anchor I-field by three frame intervals. Thus, the search area for the motion vectors defines a 96 by 96 block of pixels and, to calculate motion vectors for this sequence which cover the same range of motions as is covered by a single frame vector, a block of 12544 pixels ($8+96+8=112$ by 112) from the anchor field would be required. This scheme would use a relatively large data path and a motion estimator 32 that could simultaneously process a very large number of combinations to achieve equivalent performance to the single frame motion estimation.

Alternatively, the motion vector may be calculated in steps using a number of method collectively known as telescoping. By these methods, the motion vector from $I_0$ to $P_6$ would be calculated in steps, using the intervening field data in the multi-field memory 24. In an exemplary telescoping scheme, the motion vector from $B_4$ to $P_6$ would be calculated and recorded, next, the motion vector from $B_2$ to $B_4$ would be calculated and recorded, and finally, the motion vector from $I_0$ to $B_2$ would be calculated. All motion vectors are calculated based on a 32 by 32 pixel search area. The equivalent motion vector from $I_0$ to $P_6$ may be determined by summing the final vector with the recorded intermediate vectors. This method uses a smaller data path from the multi-field memory 24 to the motion estimator 32, but uses more time to calculate the motion vector since it involves a sequence of steps. Some of this time may be recovered by using pipeline processing to calculate the motion vectors and/or by saving the intermediate motion vectors for use when the motion vectors for the B-fields are calculated.

As each of the P-fields is encoded, a reconstructed version of the field is stored in the multi-field memory 48. Once the reconstructed even and odd I-fields and the even and odd P-fields have been stored in the multi-field memory 48, the intermediate even and odd B-fields (i.e. $B_2$, $B_3$, $B_4$ and $B_5$ which are held in the multi-field memory 24) can be predicted using the fields $I_0$, $I_1$, $P_6$ and $P_7$ fields as anchor fields. In the exemplary group-of-fields sequence shown in FIG. 2 $B_2$ and $B_4$ are predicted from $I_0$ and $P_6$ while $B_3$ and $B_5$ are predicted from $I_1$ and $P_7$.

The circuitry shown in FIG. 1 encodes these fields as follows. The control circuitry 21, via signal M1C, conditions the field memory 24 to provide the stored data for field $B_2$, one macroblock at a time, to the multiplexer 22. At the same time, the circuitry 21 uses the signals MX2 and MX3 to provide corresponding 48 by 48 pixel blocks from each of the fields $I_0$ and $P_6$ to the motion estimator 32 via the multiplexers. Motion vectors from $I_0$ to $B_2$ may be calculated by the motion estimator 32 in one step. Motion vectors from $B_2$ to $P_6$, on the other hand, may be calculated by at least two methods. First, an 80 by 80 pixel block may be provided to the motion estimator by the multi-field memory 24 and the motion vector may be calculated using conventional methods, over this larger block. Second, the motion vector may be calculated by any one of a number of well known telescoping techniques.

The circuitry 21 uses the signal MX1 to condition the multiplexer 22 to apply the $B_2$ macroblocks to the subtracter 22, to the motion estimator 32 and to the motion compensator 36. The motion estimator 32 uses the data from fields $I_0$ and $P_6$ to calculate the best backward and forward motion vectors (BMv and FMv) for the macroblock that is currently being processed from field $B_2$.

The motion vectors BMv and FMv are applied to the motion compensator 36 and to the control circuitry 21.

Based on these vectors, the circuitry 21 conditions the multi-field memory 48 and the multiplexers 50 and 52 to apply the indicated macroblocks to the motion compensator 36. The motion compensator 36 calculates three residue values, one for forward motion, using $I_0$ as the anchor field; one for backward motion, using $P_6$ as the anchor field; and one in which the anchor field is the average of the anchor macroblocks from $I_0$ and $P_6$.

Of these three residues, one is selected as the best based on a measure of the entropy of the residue. Exemplary measures include the absolute difference and the mean squared difference between the anchor and target macroblocks. The macroblock which produces the best residue is applied, by the motion compensator 36, to the subtracter 26 via the multiplexer 34. As described above, subtracter 26 generates the residue and applies it to the DCT circuitry 38 and to the quantization circuitry 40 which encodes it. The encoded data is then combined with the motion vectors BMv and FMv provided by the motion estimator 32 in a variable length coder 54. The signal provided by the coder 54 is transmitted by the signal conveyor 58 to a remote destination.

In the sequence shown in FIG. 2, the $B_2$–$B_5$ fields are not used to generate any other fields. Accordingly, they are not decoded and stored in the multi-field memory 48.

FIG. 3 shows a method which is similar to that shown in FIG. 2 except that, instead of the corresponding odd and even I and P-fields being used to predict other odd and even fields, either the odd I and P-fields or the even I and P-fields may be used as an anchor to predict an individual odd or even predictive field. In the field sequence of FIG. 3, $I_0$ and $I_1$ are created the same way s in FIG. 2; however, $P_6$ is now predicted based on the minimum difference value (or some other criterion) developed using $I_0$ or $I_1$ as the anchor field. The same is true for $P_7$, both the odd and even fields of the I frame, $I_0$ and $I_1$, are used to predict the odd field, $P_7$. Finally, the individual B-fields, odd or even, are predicted using the both fields of each of the I and P-frames: $B_2$, $B_3$, $B_4$ and $B_5$ are all predicted using the best match obtained from $I_0$, $I_1$, $P_6$ and $P_7$ or from combinations of one of the I-fields and one of the P-fields.

The above configurations derive directly from the frame-oriented MPEG system. The present invention, as illustrated by the group of field configurations described below, differs from these schemes by taking advantage of the field-.oriented MPEG system to decrease the prediction time interval and the predictive refresh time. In addition, these schemes reduce the number of bits used to convey the image by substituting P-fields for I-fields and B-fields for P-fields where appropriate. So, progressing from the traditional methods of field processing, FIGS. 4 through 10 show new and better group of field configurations for image processing.

Figure 4:
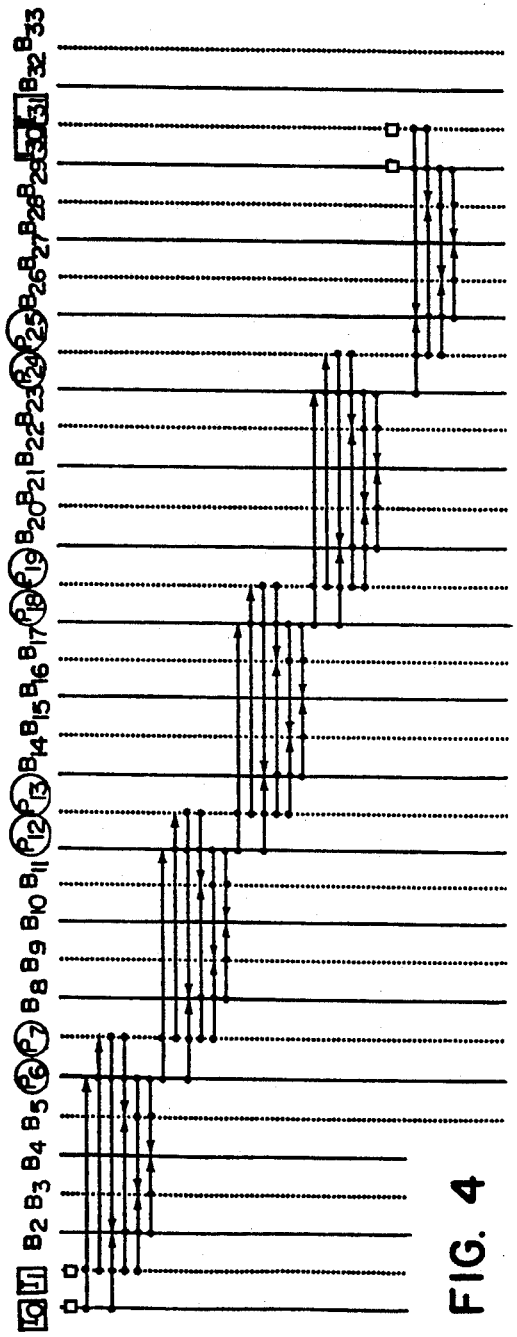
FIGS. 4-9 are field sequence diagrams which are useful for describing the invention as embodied in the system shown in FIG. 1.

FIG. 4 shows a configuration which can be characterized as using the available closer fields to do the predictions. As in the configurations shown in FIGS. 2 and 3, $I_0$ and $I_1$ are encoded using intrafield processing. Then, these are used as the anchor frame to predict the even field of the next anchor frame, $P_6$. To predict the odd field, $P_7$, of the next anchor frame however, $I_1$ and $P_6$ are used and not $I_0$ and $I_1$. The use of field $P_6$, instead of field $I_0$, to predict field $P_7$ reduces the prediction time span from 7 field intervals to 1 field interval. Thus, it is likely that the prediction of $P_7$ based on $I_1$ and $P_6$ will produce a residue signal that can be encoded in fewer bits than the prediction of $P_7$ based on $I_0$ and $I_1$.

Similarly, this method is applied to the bidirectional B-field prediction. Field $B_2$ is predicted as shown above in FIG. 3 as the minimum residue of $I_0$, $I_1$, $P_6$ and $P_7$ or as the residue of the average of one of the I-fields and one of the P-fields if that residue is smaller. Field $B_5$, however, is calculated as the minimum residue of the fields $I_1$, $B_2$, $P_6$ and $P_7$. Similarly, $B_3$ is calculated from fields $I_1$, $B_2$, $B_5$ and $P_6$ and $B_4$ is calculated from fields $B_2$, $B_3$, $B_5$ and $P_6$. In order to avoid the error propagation among B-fields, the use of B-fields for predicting other B-fields is restricted to be within the boundaries of the anchor frames on either side of the B-fields.

The processing of the $I_0$, $I_1$, $P_6$ and $P_7$ fields is essentially the same as outlined above with reference to FIGS. 2 and 3. The processing for field $B_2$, however, is different; since this field is later used to predict fields $B_3$, $B_4$ and $B_5$, $B_2$ is reconstructed and stored in the multi-field memory 48. In addition, the processing of the fields $B_3$, $B_4$ and $B_5$ is different since these fields are encoded with reference to reconstructed B-fields. These fields are also encoded in a different order: $B_2$, $B_5$, $B_3$ and $B_4$ instead of $B_2$, $B_3$, $B_4$ and $B_5$. Since the anchor B-field is often the closest in time to the field that is being encoded, it is likely that it will provide better motion compensation than the other anchor field. The inventor has determined that this method significantly reduces the number of bits needed to encode a sequence of video fields compared to the methods described above with reference to FIGS. 2 and 3.

In the system shown in FIG. 4, fields $B_2$, $B_3$ and $B_5$ are stored in the memory 48 while none of the B-fields are stored when the group of fields configuration shown in FIGS. 2 and 3 is used. In the configuration shown in FIG. 5, however, field $B_2$ may overwrite field $I_0$ and field $B_3$ may overwrite field $I_1$. Consequently, only one additional field of storage is used for the configuration shown in FIG. 5 compared to those shown in FIGS. 2 and 3.

Another variation on the methods shown in FIGS. 2 and 3 which has produced a significant increase in video data compression is to distribute the I-fields and the P-fields among the B-fields. FIG. 5 shows an exemplary group of fields configuration in which the P-fields are not grouped in P-frames, as in FIGS. 2, 3 and 4, but occur as single fields separated by intervening B-fields.

The increase in data compression achieved by using this scheme results from a reduction in the prediction time span relative to the configurations shown in FIGS. 2 and 3. In the group-of-fields configuration FIG. 5 the first predictive field is $P_4$, the fourth field rather than the sixth field. Thus, the time span for the prediction is three or four field intervals rather than five or six as in the configuration shown in FIG. 3. Furthermore, the second predictive field, $P_7$ is generated either from field $I_1$ or from field $P_4$ depending on which has the smaller residue. As described above, for images of moving objects, especially if the objects do not move by simple translation, the prediction of $P_7$ based on $P_4$ will generally produce a smaller residue than the prediction based on $I_0$.

Figure 5:
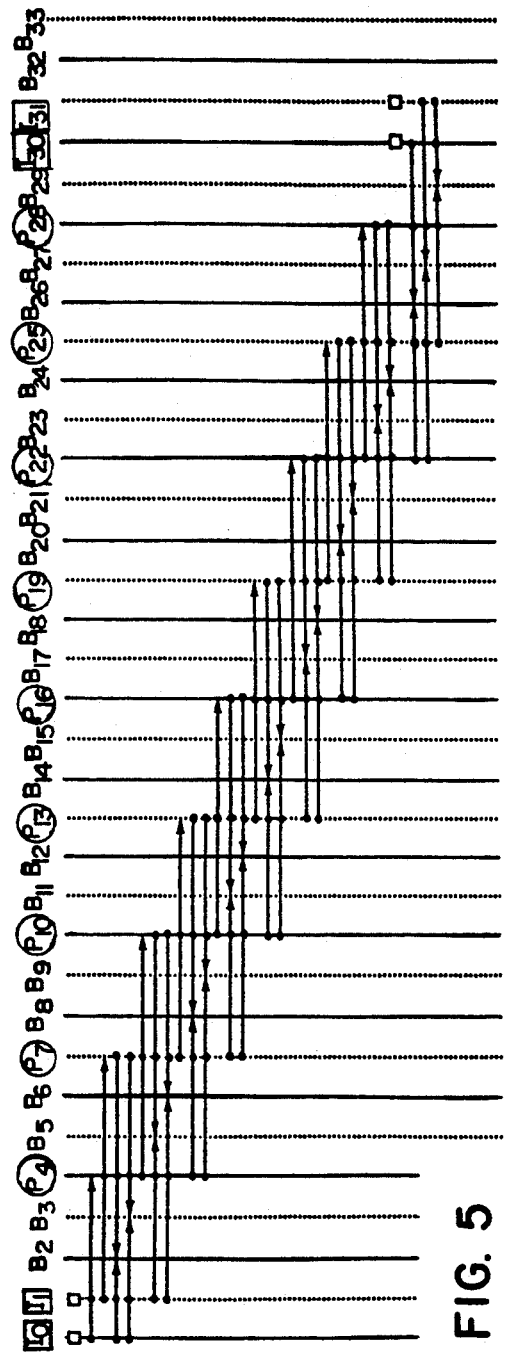

In addition to shortening the time span over which P-fields are predicted, the configuration shown in FIG. 5 also reduces the time span over which B-fields are predicted. As shown in FIG. 5, fields $B_2$ and $B_3$ are predicted from fields $I_0$, $I_1$, $P_4$ and $P_7$, while fields $B_5$ and $B_6$ are predicted from fields $I_1$, $P_4$, $P_7$ and $P_{10}$.

Figure 6:
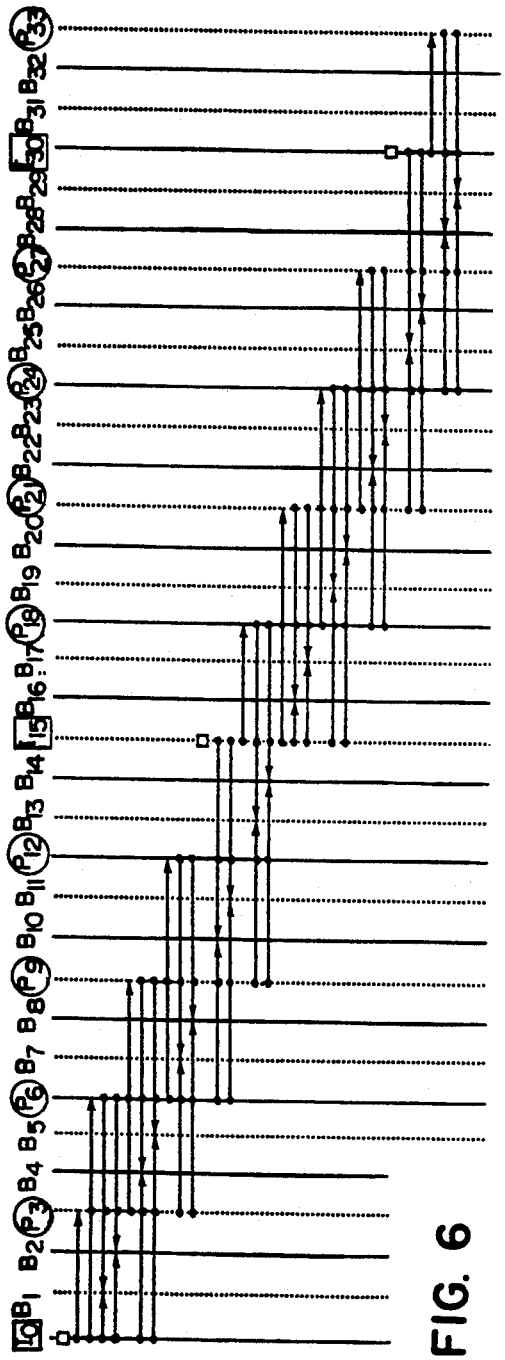

FIG. 6 shows a configuration in which both the P-fields and I-fields are distributed among the B-fields. In addition to reducing the time span over which P-fields and B-fields are predicted, this scheme refreshes the prediction more frequently and, so, reduces the visibility of any errors that may occur in the prediction process.

In FIG. 6, field $P_3$ is predicted from field $I_0$, field $P_6$ is predicted from $I_0$ and $P_3$ and field $P_9$ is predicted from $P_3$ and $P_6$. Fields $B_1$ and $B_2$ are predicted from fields $I_0$, $P_3$ and $P_6$, while fields $B_4$ and $B_5$ are predicted from fields $I_0$, $P_3$, $P_6$ and $P_9$. Each of the B-fields may be predicted over a time span of one field interval while each of the P-fields may be predicted over a time span of three field intervals.

If the prediction refresh time is kept the same as in the sequences shown in FIGS. 2 and 3, the number of I-fields can be decreased by one-half. This results in fewer bits on the average being used to encode a group of fields.

Figure 7:
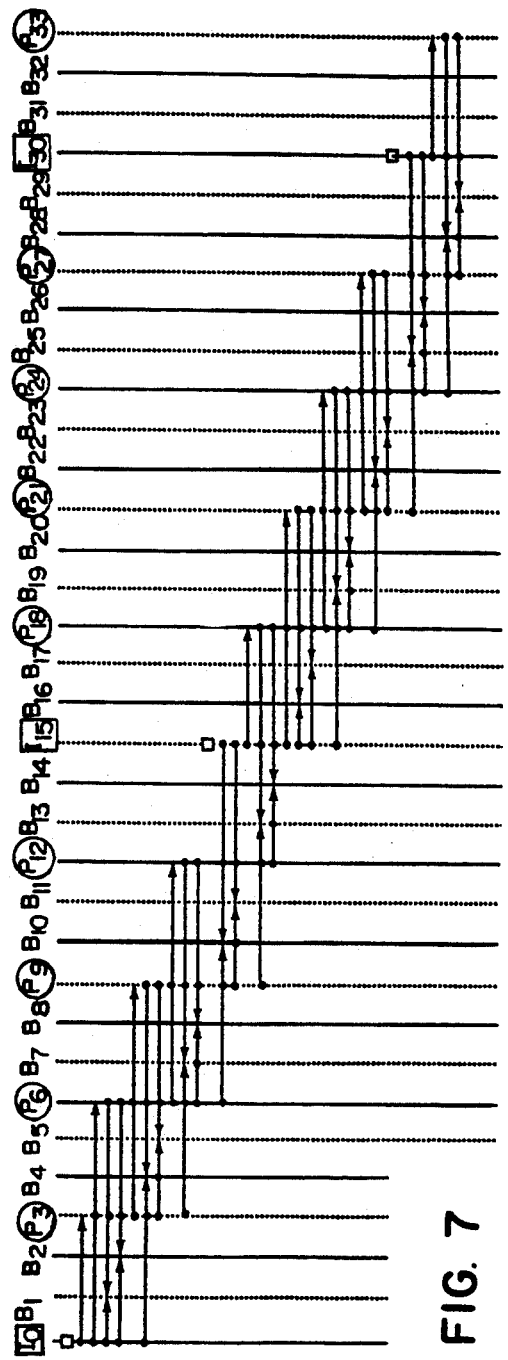

FIG. 7 illustrates a group-of-fields configuration in which P-fields and I-fields are distributed among the B-fields and the closer available field is used to predict B-fields. The processing of the first six fields for this group-of-fields configuration is the same as for the configuration shown in FIG. 6 except for field $B_5$. In the scheme shown in FIG. 7, this field is predicted from fields $P_3$, $B_4$, $P_6$ and $P_9$ while in the scheme shown in FIG. 6 it was predicted from fields $I_0$, $P_3$, $P_6$ and $P_9$. This reduction in the predictive time span for one of the anchor fields from three field intervals to one field interval increases the likelihood of producing a predictive residue that has a relatively small average magnitude.

Figure 8:
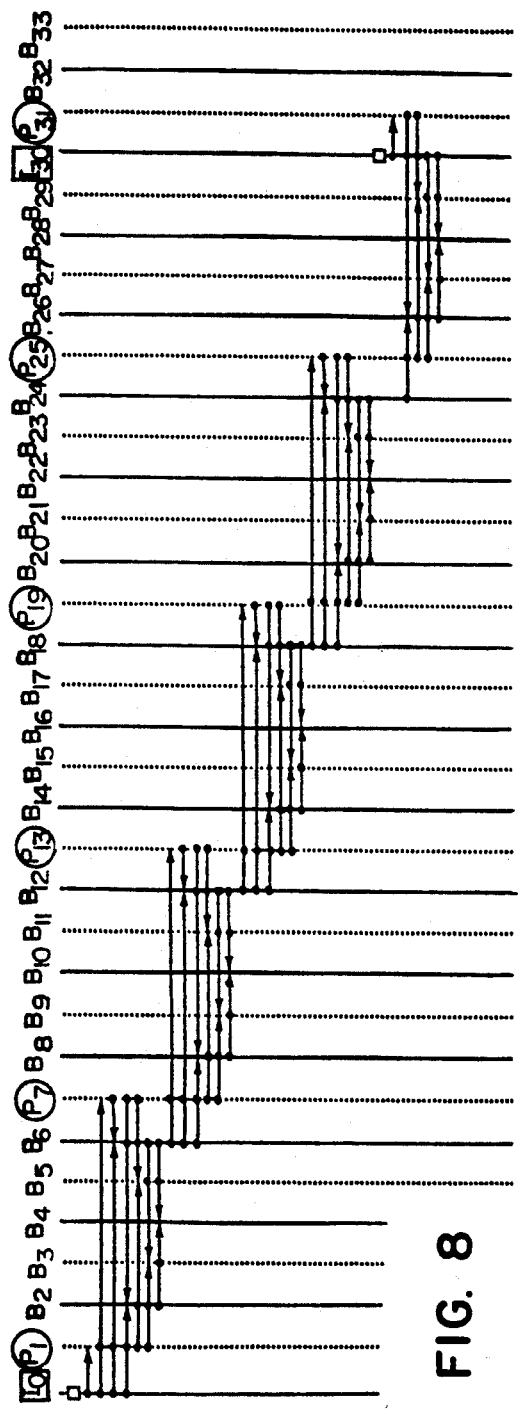

The group-of-fields configuration shown in FIG. 8 reduces the number of I-fields and P-fields used to represent the image, and at the same time, uses the closer available I, P or B-field to predict each B-field. This scheme reduces the total number of bits needed to encode the image since, in general, P-fields use fewer bits than I-fields and B-fields use fewer bits than P-fields.

In the configuration shown in FIG. 8, field $P_1$ is predicted from field $I_0$ and field $P_7$ is predicted from $I_0$ and $P_1$. Field $B_6$ is predicted from three fields, $I_0$, $P_1$ and $P_7$, while $B_2$ is predicted from four fields, $I_0$, $P_1$, $B_6$ and $P_7$. Field $B_5$ is predicted using fields P, $B_2$, $B_6$ and $P_7$. Field $B_5$ is then used along with fields $B_6$, $P_1$ and $B_2$ to predict field $B_3$. Finally, field $B_4$ is predicted entirely from B-fields: $B_2$, $B_3$, $B_5$ and $B_6$.

In this configuration, predictive field $P_1$ is used in the same manner as the intra field $I_1$ was used in the configuration shown in FIG. 4 while the field $B_6$ is used in the same manner as field $P_6$ in FIG. 4.

Figure 9:
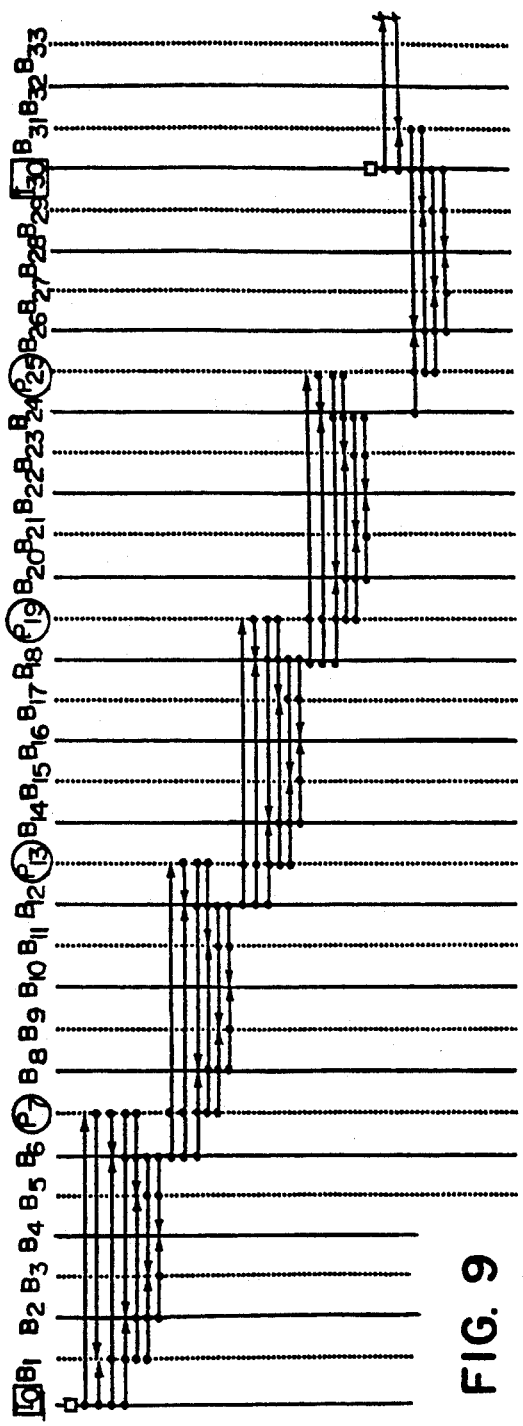

A final group-of-fields configuration is shown in FIG. 9. This configuration is an extension of that shown in FIG. 8. Instead of substituting P fields for I-fields the configuration shown in FIG. 9 substitutes B-fields for I-fields. This scheme achieves a lower average bit-rate than the scheme shown in FIG. 8 since, on the average, fewer bits are used to encode a B-field than are used to encode a P-field.

In addition to the group-of field configuration shown in FIGS. 4-9, it is contemplated that other configurations based on other combinations of the described techniques may be used to efficiently encode images. Furthermore, it is contemplated that several of these group-of-fields configurations could be used to encode a single image sequence by adding a code at the start of a sequence to define the group-of-fields configuration to the receiver. A particular group-of-fields configurations may be automatically selected by an image signal processor, for example, based on the amount and type of motion in an image or upon the level of detail in the image.

The invention claimed is:

1. A method for automatically encoding a sequence of video image fields comprising the steps of:

encoding each field in said sequence of video image fields in a predetermined order to produce a sequence of encoded fields wherein a plurality of the fields in the sequence of video image fields are bidirectionally predictively encoded;

decoding each field in the sequence of encoded fields to produce a sequence of decoded fields; and storing each field in said sequence of decoded fields to produce a sequence of stored fields;

wherein, each field in said sequence of video image fields which is bidirectionally predictively encoded is encoded using data from one of said stored fields which is closest in position in said sequence of video image fields to the field being bidirectionally predictively encoded.

2. The method of claim 1, wherein said sequence of video image fields are interleaved even and odd fields arranged so that each pair of even and odd fields forms a frame, and said method further includes the step of predictively encoding one of the odd and even fields of one frame as a P-field when the other one of the odd and even fields of the one frame has been encoded as an I-field, using only information in the one other field.

3. A method for automatically encoding sequential fields of video information comprising the steps of:

encoding a first one of said sequential fields using only the video information in the first field to produce an I-field;

predictively encoding a second one of said sequential fields, separated from said first field by a plurality of field intervals, using the video information in the first and second fields to produce a P-field;

predictively encoding a third one of said sequential fields, occupying a position in the sequence between said first field and said second field, using the video information in the third field and in one of the first and second fields to produce a first B-field; and predictively encoding a fourth one of said sequential fields, occupying a position in the sequence between said second field and said third field, using the video information in the fourth field and in one of the first, second and third fields to produce a second B-field.

4. A method according to claim 3, wherein said sequential fields of video information are interleaved even and odd fields arranged so that each pair of even and odd fields forms a frame, and said method further includes the step of encoding one of the odd and even fields of one frame as a B-field when the other one of the odd and even fields of the one frame has been encoded as a P-field.

5. A method according to claim 4, wheerin the encoded fields are arranged in the same sequence as said sequential fields and each P-field is separated from the next P-field by at least one B-field.

6. A method according to claim 4, wherein the encoded fields are arranged in the same sequence as said sequential fields and each I-field is separated from the next I-field by at least one B-field.

7. The method of claim 3, wherein said sequential fields of video information are interleaved even and odd fields arranged so that each pair of even and odd fields forms a frame, and said method further includes the step of encoding one of the odd and even fields of one frame as a B-field when the other one of the odd and even fields of the one frame has been encoded as an I-field.

8. A method for automatically encoding sequential interleaved even and odd fields of video information wherein each pair of even and odd fields forms a frame of video information, said method comprising the steps of:

encoding one of the even fields of video information predictively using only information in the one even field and in a predecessor field occurring earlier in the sequence; and encoding the odd field in the same frame as the one even field, bidirectionally predictively using information in the odd field, information in the one even field and information in a successor field occurring later in the sequence than the odd field.

9. The method of claim 8, further including the step of encoding an even field which immediately follows said one even field and said odd field in the sequence bidirectionally predictively using information in the odd field, information in the one even field and information in the successor field.

10. A video data compression system which encodes sequential fields of video information comprising:

means for encoding a first one of said sequential fields using only the video information in the first field to produce an I-field.

means for predictively encoding a second one of said sequential fields, separated from said first field by a plurality of field intervals, using the video information in the first and second fields to produce a P-field;

means for predictively encoding a third one of said sequential fields, occupying a position in the sequence between said first field and said second field, using the video information in the third field and in one of the first and second fields to produce a first B-field; and means for predictively encoding a forth one of said sequential fields, occupying a position in the sequence between said second field and said third field, using the video information in the fourth field and in one of the first, second and third fields to produce a second B-field.

11. A video data compression system which encodes sequential interleaved even and odd fields of video information wherein each pair of even and odd fields forms a frame of video information, said system comprising:

means for encoding one of the even fields of video information predictively using only information in the one even field and in a predecessor field occurring earlier in the sequence; and means for encoding the odd field in the same frame as the one even field, bidirectionally predictively using information in the odd field, information in the one even field and information in a successor field occurring later in the sequence than the odd field.

12. Apparatus for automatically encoding a sequence of video image fields comprising:

means for encoding each field in said sequence of video image fields in a predetermined order to produce a sequence of encoded fields, wherein a plurality of the fields in the sequence are bidirectionally predictively encoded;

means for decoding each field in the sequence of encoded fields to produce a sequence of decoded fields; and means for storing each field in said sequence of decoded fields to provide a sequence of stored fields;

wherein, each field in said sequence of video image fields which is bidirectionally predictively encoded uses data from one of said stored fields which is closest in position in said sequence of video image fields to the field being bidirectionally predictively encoded.

* * * * *